United States Patent Office 3,514,308
Patented May 26, 1970

3,514,308
BONDING POLYOLEFINS TO METALLIC SUBSTRATES
John N. Scott, Jr., Bartlesville, Okla., and Robert P. Slicker, Titusville, Pa., assignors to Phillips Petroleum Company, a corporation of Delaware
No Drawing. Filed May 16, 1966, Ser. No. 550,134
Int. Cl. C23c 3/00; C09j 5/00
U.S. Cl. 117—21                    7 Claims

ABSTRACT OF THE DISCLOSURE

Polyolefins are bonded to metal surfaces by contacting the polymer with the metal surface at a temperature in excess of the melting point of the polymer, subjecting the metal substrate and adherent polymer to vacuum treatment while maintaining the temperature in excess of the melting point of the polymer for a period of time sufficient to remove substantially all of the volatile material present in the polymer and at the interface, and then cooling below the melting point of the polymer, preferably while maintaining a vacuum.

---

This invention relates to bonding polyolefins to metallic substrates. In one aspect, a polyolefin is bonded to a metallic substrate by heating said polyolefin in an oxygen containing atmosphere in contact with said substrate, reducing the pressure on the system and cooling the polyolefin and substrate below the melting point of said polyolefin. In another aspect, a particulate solid polymer of olefins having from 2 to about 4 carbon atoms is contacted with a metallic substrate and heated above the melting point of said polymer in an oxygen containing atmosphere, subjected to reduced pressure and cooled below the melting point of said polyolefin.

In the bonding of polyolefins to metals it is, of course, desirable in many cases to effect a bond between the polymer and metal sufficient to withstand the demands of subsequent applications. In addition to this consideration, where it is intended to apply an adhesive, protective film of polyolefin on a metal surface, it is also desirable in many applications to obtain a coating having a high degree of clarity in addition to good impact resistance. It is known that coatings having sufficient clarity and bond strength as well as high impact resistance can be achieved through the use of relatively low molecular weight polyolefins as the coating medium. However, where it is desirable to use polymers of relatively higher molecular weight in order to achieve improved impact resistance the problems of obtaining a relatively clear coating of high bond strength are considerably amplified. The lack of clarity in these relatively high molecular weight polymer coatings or conversely the presence of haze in the finished product are due, at least in part, to the presence of entrained vaporous material in the polymer coating. In addition to impairing the clarity of the finished coating, the vaporous material, also subsisting at the interface between the polymer and the metallic substrate also impairs the strength of the bond between the polymer and metal. We have also found, however, that when the coating operation is conducted in an atmosphere of substantially reduced pressure that the strength of the resultant polymer-metal bond is not generally improved. Although the reason for this result is not completely understood in detail, we have found that it is due in part to the relatively low concentration of oxygen in the atmosphere surrounding the polymer during the heat step where the entire operation is conducted in an atmosphere of reduced pressure. It, therefore, seems reasonable to conclude that when the polyolefins are heated above their melting point in the presence of oxygen that some of the oxygen is combined with the polymer, and that these polar groups incorporated into the polymer coating substantially enhance and improve the strength of the bond between the polymer and the metal substrate.

It is therefore an object of this invention to provide an improved method for bonding polyolefins to metallic substrates. It is another object of this invention to provide a method for producing polyolefin coatings on metallic substrates having improved clarity, impact resistance and bond strength.

In accordance with one embodiment of this invention, polyolefins are bonded to a suitable metal by contacting the solid polymer and metal in an oxygen containing atmosphere and at a temperature sufficient to effect the substantially complete melting of the polyolefin at the polymer-metal interface. A vacuum is then drawn on the system sufficient to remove substantialy all of the gaseous material contained in the melted polymer and at the polymer-metal interface while the polymer is still in a fluid state sufficient to allow the escape of such gaseous material. The polymer and metal substrate are cooled to a temperature below the melting point of the polymer so as to effect a bond between the polymer and metal substrate.

In another embodiment of this invention, a heated, metal substrate to be coated with polyolefin is introduced into a fluidized bed of particulate polyolefin which bed is fluidized by an oxygen containing gas so that the particulate polyolefin contacting the metal substrate heated to a temperature in excess of the melting point of the polyolefin, is partially melted and adheres to the metal substrate in sufficient quantity to provide a coating of the desired thickness. The substrate and adherent particulate polymer can then be removed from the fluid bed and subjected to an atmosphere of reduced pressure at a temperature sufficient to maintain the adherent polymer in a fluid state so that it spreads evenly over the metal substrate. These conditions of reduced pressure and temperature are maintained for a sufficient length of time to allow the polymer particles to completely coalesce and form a substantially even film over the metal surface. By maintaining a reduced pressure on the system during the period in which the polymer is in a melted state, the gaseous materials contained in the polymer and at the polymer-metal interface migrate through the polymer and escape, thereby substantially minimizing the porosity of the polymer film and increasing the contact area between polymer and metal. After sufficient time has elapsed to allow the substantially complete removal of volatile material from the polymer film, the film and substrate are cooled to a temperature sufficiently below the melting point of the polymer to effect the solidification of the polymer and produce the desired coated article.

The concept of this invention is particularly applicable where the coating material comprises an olefin polymer as binder. Polymers suitable in this application can be either plastic or elastomeric in character although in most applications it is preferred to employ relatively crystalline polymers having high impact resistance. For example, suitable polymers can be obtained by polymerizing one or more olefins such as ethylene, propylene, butylenes, isobutylene, butadiene, pentenes, styrene and others to produce polymers such as polyethylene, polypropylene, polybutene-1, polybutadiene, polystyrene, ethylene-propylene copolymers, ethylene-butylene copolymers, styrene-butadiene copolymers, ethylene-propylene-butene-1 terpolymers, and others. Suitable coating compositions that can be employed satisfactorily in the coating operation described can comprise singular polymers or combinations thereof with or without additives or fillers as desired. It is only necessary that these compositions can be rendered sufficiently fluent at the conditions employed in the coating operation so that the objective of removing the substantial amount of the volatile materials contained in the coating composition can be achieved. As a result, it is generally preferred that the coating compositions described have viscosities within the range of from about $1 \times 10^5$ to about 1 centipoise at coating temperatures of from about 300 to about 700° F.

Although numerous polymers and blends thereof with or without additives and fillers can be satisfactorily employed in this procedure, it is generally preferred to use compositions comprising polymers of 1-olefins having from 2 to about 4 carbon atoms.

The molecular weight, molecular weight distribution, relative monomer concentrations and crystalline-amphorous characteristics of the polymers employed can vary substantially with the only essential requisite being that the polymers are essentially solid at the conditions under which the finished article will be used. The molecular weight and other physical characteristics of the polymers employed will, of course, depend upon the particular polymer and the end use desired. In the presently preferred embodiment of this invention, polypropylene is employed as the coating medium. Where polypropylene is used, the weight average molecular weight of the polymer is desirably within the range of from about 15,000 to about 3 million, although a presently preferred range is from about 30,000 to about 2 million; the ratio of weight average to number average molecular weight is preferably within the range of from about 5:1 to about 40:1, and intrinsic viscosity is preferably within the range of from about 0.5 to about 12. In the presently preferred mode of operation, a particulate solid polypropylene having a number average particle size within the range of about 0.01 to about 1 millimeter is suspended in a fluidized bed by passing an oxygen containing gas upwardly through the particle mass at sufficient velocity to maintain the particulate polymer in a suspended fluid state. Gas velocities employed will, of course, vary with the density of the polymer and with particle size. Suitable ranges of gas velocities at atmospheric pressure and temperature for the polymers described is desirably within the range of about 0.1 to about 50 feet per second. The metal surface to be coated with polymer is preferably heated to a temperature only slightly in excess of the melting point of the polymer so as to effect adhesion of the particulate polymer to the metal surface on immersion of the metal surface into the fluid bed. As the polymers presently preferred as coating materials in this invention generally exhibit melting points within the range of about 125 to about 350° F., it is desirable to maintain the temperature of the substrate prior to its introduction into the fluid bed at a temperature of about 200° F. in excess of the melting point of the polymer employed. The metal surface is preferably allowed to remain in contact with the fluid polymer particles for a period of from about 0.03 to about 1 minute depending, of course, on the thickness of the coating desired. Up to a certain point, the thickness of the final coating is a function of immersion time in that longer immersion times provide for more complete saturation of the metal surface with polymer particles.

The metal substrate and adhering polymer particles are then removed from the fluid bed and subjected to an atmosphere of reduced pressure to effect the removal of volatile materials from the polymer coating. The temperature of the metal surface and the polymer coating during this vacuum treatment is desirably maintained, at least during the initial stages thereof, at a point substantially in excess of the melting point of the polymer so as to promote complete coalescing of the polymer particles with the consequent formation of a substantially uniform film distributed evenly over the metal surface. The degree of vacuum employed and the duration of vacuum treatment will, of course, depend upon the physical characteristics of the polymer and the temperature at which the polymer and substrate are maintained during the vacuum treatment. It is preferred, however, in the present embodiment of this invention where polypropylene, as previously described, is employed as the coating material, that the absolute pressure during the vacuum treating step is maintained within the range of from about 1 to about 5 p.s.i.a. for a time of from about 0.5 to about 10 minutes. The temperature of the polymer and metallic substrate during this vacuum step is desirably maintained within the range of about 100 to about 300° F. in excess of the initial melting point of the coating polymer. After sufficient time has elapsed to assure the substantially complete removal of volatile material from the polymer layer and the essentially complete coalescing and stabilization of the polymer film, the polymer and substrate can be cooled to a temperature sufficiently below the initial melting point of the polymer to insure setting of the polymer film before removal of the coated, metal surface from the vacuum zone. The cooling step can be effected by any suitable means with the only essential restriction being that the vacuum on the system is not completely eliminated prior to the freezing of the polymer coating. However, this limitation is in itself not critical, but is rather only preferred for the reason that setting the polymer under vacuum improves the degree to which voids are eliminated in the finished article. In the presently preferred operation, the substrate and coating can be cooled by introducing a cooling gas to the system at a controlled rate while removing it from the system at substantially the same mass flow rate by suitable vacuum means in order to maintain the vacuum on the system. The cooling gas temperature is preferably within the range of from about 0 to about 150° F., but in essence it is only required that the temperature be sufficiently low to effect the desired degree of cooling within a reasonable period of time.

The application of the concept of this invention in one particular instance and the improvements in product clarity, adhesion and impact strength obtained thereby are illustrated in the following example.

EXAMPLE

A strip of mild steel, 1 inch by 6 inches by 0.1 inch, is heated to 500° F. in a hot air oven. This strip is then held for five seconds in a bed of particulate polymer which is fluidized by injecting a stream of air from the bottom of the bed. The thus coated strip is then transferred to a vacuum chamber held at a pressure of 2 p.s.i.a. for 5 minutes. The temperature in this chamber is held at 500° F. The coated strip is then removed and cooled by imposing a blast of 80° F. air on the strip. The resulting polymer coating is bonded tightly to the metal substrate. The polymer used is 0.90 density (ASTM D1505-60T), 4 melt flow (ASTM D1238-62T, Condition L) polypropylene. The average particle diameter of the powdered polymer is 0.1 millimeter.

Although it is presently preferred to employ fluid bed coating techniques as described, it is obvious that numerous other coating techniques would be sufficient to effect the desired contact between the polymer particles and the metal surface. For example, the polymer particles could be sprayed onto the heated metal substrate and essentially the same results could be achieved.

Alternatively, a relatively cool metal surface could be introduced into a molten solution of the desired polymer thereby effecting coating of the metal surface which would then be removed and subjected to the vacuum treatment previously with the exception that it would probably be necessary in such operations to heat both the metal surface and polymer coating to a temperature in excess of the melting point of the polymer during the vacuum treatment in order to effect the desired removal of volatile material from the polymer coating.

Reasonable variation and modification of the concept of this invention will be apparent to one skilled in the art in view of the foregoing disclosure and the appended claims to this invention, the essence of which is that there is provided a method for coating a metal surface with a polymer composition comprising polyolefin by contacting the metal surface with said polyolefin at a temperature in excess of the melting point of the polymer in the presence of an oxygen containing gas, subjecting the substrate and adherent polymer to an atmosphere of reduced pressure sufficient to effect the removal of volatile material from the polymer coating and initially at a temperature sufficiently in excess of the melting point of the polymer to effect the coalescing of the polymer particles to form a uniform coating on the metal surface and cooling the metal and polymer to a temperature sufficiently below the melting point of the polymer to effect the solidification thereof.

We claim:

1. A method of bonding a composition comprising polyolefins to a metallic substrate which method comprises:
   (a) heating said substrate to a temperature sufficient to melt said polyolefin,
   (b) contacting said heated substrate with particulate polyolefin in a fluidized bed of said polyolefin and in an oxygen containing atmosphere to fluidize said bed and to effect adhesion of said polyolefin to said substrate,
   (c) removing said substrate and adherent particulate polyolefin from said fluidized bed and subjecting same to an atmosphere of reduced pressure to remove substantially all of the gaseous material contained in said melted polyolefin between said polyolefin and said substrate interface and an elevated temperature sufficient to maintain the adherent particulate polyolefin in a fluid state so that it spreads evenly over the metal substrate,
   (d) maintaining the conditions of reduced pressure and elevated temperature for a sufficient length of time to completely coalesce the polyolefin particles and form a substantially even film over the metal substrate and to remove substantially all of the occluded gaseous material contained in the melted polyolefin, and
   (e) cooling said polyolefin and said substrate to a temperature below the melting point of said polyolefin so as to effect a bond between the polyolefin and metal substrate.

2. The method of claim 1 wherein said polyolefin is a polymer of at least one monomer having from about 2 to about 4 carbon atoms.

3. The method of claim 2 wherein said polyolefin has a weight average molecular weight within the range of from about 15,000 to about 3 million and a ratio of weight average to number average molecular weight of from about 5:1 to about 40:1.

4. The method of claim 1 wherein said solid polyolefin is in particulate form having an average particle diameter of from about 0.01 to about 1 millimeter.

5. The method of claim 1 wherein said polyolefin is polypropylene, and wherein said contacting is effected in a fluidized bed of particulate polypropylene which is fluidized by air, and further wherein the temperature of the polypropylene and metallic substrate during the reduced pressure step is maintained within the range of about 100 to 300° F. in excess of the initial melting point of the polypropylene, and further wherein reduced pressure is maintained during the cooling step so as to effect substantially complete removal of volatile material.

6. The method of claim 1 wherein said heating temperature is within the range of from about 300 to about 700° F.

7. The method of claim 1 wherein said composition has a viscosity of from about $1 \times 10^5$ to about 1 centipoise at a temperature of from about 300 to about 700° F.

References Cited

UNITED STATES PATENTS

| | | | |
|---|---|---|---|
| 2,911,678 | 11/1959 | Brunfeldt | 264—102 |
| 2,981,631 | 4/1961 | Nagel | 117—119 XR |
| 3,305,416 | 2/1967 | Kahan et al. | 156—286 XR |
| 3,323,965 | 6/1967 | Hanle et al. | 156—272 XR |
| 3,348,995 | 10/1967 | Baker et al. | 156—283 XR |

FOREIGN PATENTS

| | | |
|---|---|---|
| 606,385 | 10/1960 | Canada. |
| 713,634 | 8/1954 | Great Britain. |

HAROLD ANSHER, Primary Examiner

D. J. FRITSCH, Assistant Examiner

U.S. Cl. X.R.

156—286, 306, 322